(12) United States Patent  
Fujinoki

(10) Patent No.: US 6,292,287 B1  
(45) Date of Patent: Sep. 18, 2001

(54) SCANNING CONFOCAL OPTICAL DEVICE

(75) Inventor: Akiko Fujinoki, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/573,565

(22) Filed: May 19, 2000

(30) Foreign Application Priority Data

May 20, 1999 (JP) ................................ 11-140210

(51) Int. Cl.$^7$ .................................................. G02B 26/08
(52) U.S. Cl. ......................... 359/212; 359/201; 359/202; 359/371
(58) Field of Search .................. 359/196, 201, 359/202, 212, 301, 371, 485, 487, 488; 385/73, 74, 31, 33; 250/201.3, 216, 234–236

(56) References Cited

U.S. PATENT DOCUMENTS 5,691,839 * 11/1997 Kobayashi ............................ 359/201
5,742,419    4/1998 Dickensheets et al. ............. 359/201
6,172,789 *  1/2001 Kino et al. ........................... 359/212

OTHER PUBLICATIONS

D. L. Dickensheets and G. S. Kino, Micromachined Scanning Confocal Optical Microscope, Optics Letters, vol. 21, No. 10, May 15, 1996, pp. 764–766.

* cited by examiner

Primary Examiner—James Phan  
(74) Attorney, Agent, or Firm—Pillsbury Winthrop LLP

(57) ABSTRACT

A scanning confocal optical device comprises a light source section, a light transmitting section, a light scanning section, a polarized-plane modulating element, a polarizing/separating element, a light detecting section and a data processing section. The light transmitting section guides light emitted from the light source section to the light scanning section, and guides returning light from the light scanning section to the light detecting section. The light scanning section scans a focused beam of light across the specimen surface. The polarized-plane modulating element comprises, for example, a $\lambda/4$ plate, which is located between the light scanning section and the specimen surface. The polarizing/separating element comprises, for example, a linearly polarizing element, which is located between the light transmitting section and the light detecting section. Since light returning from the specimen surface passes through the $\lambda/4$ plate twice before entering the light scanning section, it is converted into linearly polarized light having a polarized plane rotated through 90° with respect to linearly polarized light exiting from the light scanning section. The linearly polarizing element transmits only light returning from the specimen surface and allows it to enter the light detecting section.

15 Claims, 3 Drawing Sheets

SCANNING CONFOCAL OPTICAL DEVICE

CROSS-REFERENCE TO RELATED APPLICATIONS

This application is based upon and claims the benefit of priority from the prior Japanese Patent Application No. 11-140210,filed May 20, 1999,the entire contents of which are incorporated herein by reference.

BACKGROUND OF THE INVENTION

This invention relates to a scanning confocal optical device, which focuses a beam of light emitted from a substantial point light source on a specimen surface and scans the focused beam of light so as to detect light reflected therefrom or fluorescence therefrom.

These days, scanning confocal optical devices are known as means for making a close observation of the surface or the interior of living tissue or a cell. Such confocal optical devices are advantageous in that they have a resolution that exceeds the resolution limit of conventional optical devices and can form a three-dimensional image. However, conventional confocal optical devices have a large optical system and hence are hard to insert into a body. Accordingly, living tissue is usually removed from the body and then observed.

To overcome the above drawback, an optical system for use in a fine scanning confocal optical device is disclosed, as an example aiming at miniaturization of optical systems, in the article "Micromachined scanning confocal optical microscope" in OPTIC LETTERS, Vol. 21, No. 10, May, 1996, or in U.S. Pat. No. 5,742,419.

As is shown in FIG. 4, the disclosed fine scanning confocal optical device comprises a light source 1, a light transmitting section 2, a light detecting section 3, a light scanning section 4 and a processing section 5. The light transmitting section 2 has a single-mode fiber, which allows the light scanning section 4 to be inserted into the body through an endoscope, so that the device suggests the possibility of the formation of a three-dimensional image of the interior of a body in a real-time manner.

FIG. 5 shows the structure of the light scanning section 4. A laser beam, which is emitted from the light source 1 and transmitted through a single-mode fiber 10 in the light transmitting section 2, is reflected by a reflective surface 11, then deflected in an X direction by an electrostatic mirror 12 for X-directional scanning, totally reflected by a reflective section 14, deflected in a Y direction by an electrostatic mirror 13 for Y-directional scanning, and focused on a specimen surface 16 by a diffractive lens 15.

The end face of the single-mode fiber 10 and the specimen surface 16 are in a conjugate relationship, and light reflected from the specimen surface 16 returns through the above-mentioned optical path, thereby converging onto the end face of the fiber 10. In other words, light reflected from the specimen surface 16 enters the diffractive lens 15, then is reflected by the electrostatic mirror 13, the reflective section 14, the electrostatic mirror 12 and the reflective surface 11 in this order, and converges onto the end face of the single-mode fiber 10 as a result of the converging function of the diffractive lens 15. Light converging on the single-mode fiber 10 is transmitted therethrough in the light transmitting section 2, and then detected by the light detecting section 3.

In the above optical system, the core of the end face of the single-mode fiber serves as a pinhole, which makes the system function as a confocal optical system. Accordingly, scattered light from a place other than a focus point on the specimen surface 16 is sufficiently weak and is not actually detected by the light detecting section 3.

By virtue of the above, the optical system has a higher resolution, than that of the conventional optical systems, both in lateral directions (X and Y directions) of the specimen surface 16 and in the depth direction (Z direction) of the surface 16. Thus, the above optical system has a higher widthwise resolving power and lengthwise resolving power than those of the conventionally used optical systems.

The above-described fine scanning confocal optical device has a lower resolving power than that of the conventional confocal optical devices. However, this resolving power is sufficient to observe, for example, the bowels, although the device has a very small size.

The above fine scanning confocal optical device is of a so-called lateral-sight type, in which the field of view is perpendicular to the longitudinal direction of the probe. On the other hand, general endoscopes are of a direct-sight type, in which their insertion direction is identical to the direction of the field of view. When using the lateral-sight type confocal optical device through a channel of the direct-sight type endoscope, it is difficult to determine the observation range of the device.

In light of the easiness of determination of the observation range or in light of the operability, a direct-sight type confocal optical device, in which its longitudinal direction is identical to the direction of the field of view, is suitable for the direct-sight type endoscope.

Moreover, an object such as a living body has a low reflectance, and accordingly a signal reflected from the living body has a very low level. In an optical system directed to a living body as an object, it is important to suppress, as much as possible, a noise component reflected from a lens surface, a reflective surface, etc. of the system without reaching the object.

BRIEF SUMMARY OF THE INVENTION

The present invention has been developed in light of the above-described circumstances, and aims to provide a direct-sight type confocal optical system capable of observing, with a high S/N ratio, even an object of a low reflectance such as a living body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

Figure 1:
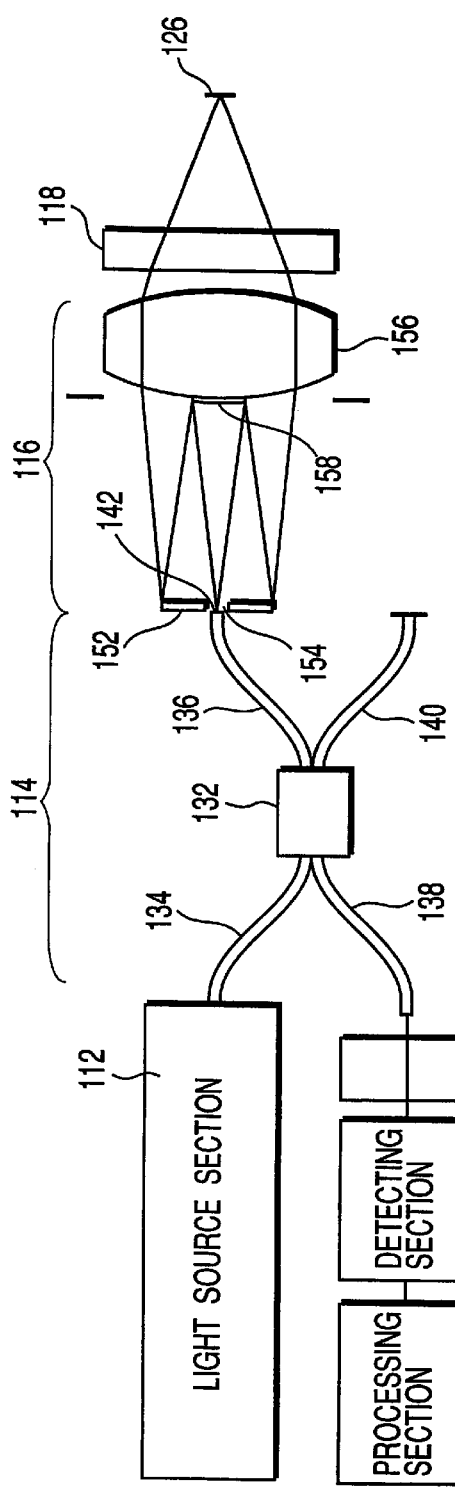
FIG. 1 shows a scanning confocal optical device according to a first embodiment of the invention.

As is shown in FIG. 1, a scanning confocal optical device according to a first embodiment basically comprises a light source section 112, a light transmitting section 114, a light scanning section 116, a polarized-plane modulating element 118, a polarizing/separating element 120, a light detecting section 122 and a data processing section 124.

The light source section 112, which includes, for example, a laser oscillator, emits linearly polarized light having a polarized plane in a particular direction. The light transmitting section 114 has, for example, a four-terminal coupler 132 for separating incident light and detection light from each other, and four optical fibers 134, 136, 138 and 140 connected to the coupler 132. The light transmitting section 114 preserves the polarized plane of light passing therethrough. In other words, the four optical fibers 134, 136, 138 and 140 connected to the four-terminal coupler 132 transmit light without influencing its polarized surface.

The optical fiber 134 optically connects the light source section 112 to the four-terminal coupler 132, the optical fiber 136 optically connects the light scanning section 116 to the four-terminal coupler 132, and the optical fiber 138 optically connects the polarizing/separating element 120 to the four-terminal coupler 132. The optical fiber 140 connected to the four-terminal coupler 132 has its free end subjected to a non-reflection treatment.

The core of the end face 142 of the optical fiber 136 can be substantially regarded as a point light source, and functions as a confocal pinhole in the scanning confocal optical device. Thus, a confocal optical system is formed between the core of the end face 142 of the optical fiber 136 and a specimen surface 126.

The light scanning section 116 includes, for example, a scanning mirror 152, a stationary mirror 158 and a condenser 156. The scanning mirror 152 comprises, for example, a micromachined mirror of a gimbal structure, which is manufactured by micromachining technology. The micromachined mirror has a reflective surface swingably supported by the gimbal structure. The reflective surface can be swung by, for example, an electrostatic force. As a result, a beam of light reflected from the reflective surface is two-dimensionally scanned.

The scanning mirror 152 has an aperture 154 at a central portion, through which a beam of light projected from the end face 142 of the optical fiber 136 passes. The stationary mirror 158 is provided on the surface of the condenser 156 that is nearer to the light source. Accordingly, the reflective surface of the stationary mirror 158 is not flat but has a certain curvature. The reflective surfaces of the scanning mirror 152 and the stationary mirror 158 are opposed to each other. The stationary mirror 158 reflects the beam of light projected from the core of the end face 142 of the optical fiber 136 toward the reflective surface of the scanning mirror 152, which, in turn, reflects the beam of light from the stationary mirror 158 toward the condenser 156. The condenser 156 focuses the beam of light from the scanning mirror 152 onto the specimen surface 126.

The polarized-plane modulating element 118 is located in front of the optical scanning section 116, i.e. between the condenser 156 and the specimen surface 126. Preferably, the polarized-plane modulating element 118 has a thickness of 0.3 mm to 2 mm. Within this thickness range, it can serve as a suitable cover glass for the endoscope. A thickness in excess of 2 mm disadvantageously causes an increase of a length of a hard portion of the endoscope.

The polarized-plane modulating element 118 comprises, for example, a phase plate, and preferably, a $\lambda/4$ plate, which converts linearly polarized light projected from the end face 142 of the optical fiber 136 into circularly polarized light. Since light returning from the specimen surface 126 enters the condenser 156 after it passes through the $\lambda/4$ plate 118 twice, it is converted into linearly polarized light having a polarized plane rotated through 90° with respect to the linearly polarized light projected from the end face 142 of the optical fiber 136.

The polarizing/separating element 120 is interposed between the optical fiber 138 and the light detecting section 122, and has a function of transmitting light having a particular polarized plane, more specifically, transmitting only light having a polarized plane perpendicular to that of the linearly polarized light projected from the end face 142 of the optical fiber 136. For example, the element 120 comprises a linearly polarizing element or a polarizing beam splitter.

It is desirable that the polarizing/separating element 120 should have an optical quenching ratio of 100:1 or more. To further enhance the S/N ratio, a plurality of polarizing/separating elements 120 may be provided.

The light detecting section 122 comprises, for example, a photoelectric converting element for outputting a signal corresponding to the amount of received light. The data processing section 124 processes scanning information and data output from the light detecting section 122.

Laser light emitted from the light source section 112 travels through the optical fiber 134, the four-terminal coupler 132 and the optical fiber 136 in this order, and exits from the core of the end face 142 of the optical fiber 136, which serves as a confocal pinhole. A beam of light exiting from the optical fiber 136, which passes through the aperture 154 of the scanning mirror 152, is reflected by the reflective surface of the stationary mirror 158 and directed to the reflective surface of the scanning mirror 152. The beam of light reflected by the reflective surface of the scanning mirror 152 is converted into a beam of converging light by the condenser 156, then into a beam of circularly polarized light by the $\lambda/4$ plate 118, and focused onto the specimen surface 126.

The beam of light falling on the specimen surface 126 is diffusely reflected in accordance with the configuration, the reflectance, etc. of the specimen. Components of the diffusely reflected light enter the condenser 156, after being converted into linearly polarized light that has a polarized plane rotated through 90° with respect to the linearly polarized light from the optical fiber 136 by passing through the $\lambda/4$ plate 118 twice.

A beam of light entering the condenser 156 is sequentially reflected by the scanning mirror 152 and the stationary mirror 158, and reaches the end face 142 of the optical fiber 136. In other words, a part of light reflected by the specimen surface 126 enters the condenser 156, so that a beam of light passing through the condenser 156 reaches the scanning mirror 152, being converged by the refractive force of the lens, the beam of light reflected by the mirror 152 reaches the stationary mirror 158, and then the beam of light reflected by the stationary mirror 158 reaches the end face 142 of the optical fiber 136.

Light introduced into the optical fiber 136 from the core of its end face 142, i.e. returning light from the light scanning section 116, travels through the optical fiber 136 and reaches the four-terminal coupler 132. The half portion of the light guided to the coupler 132 travels through the optical fiber 138, exists the end face of the fiber 138, and enters the polarizing/separating element 120.

The polarizing/separating element 120 transmits particular components of light projected from the optical fiber 138, which have a common polarized plane. More specifically, the element 120 transmits only light having a polarized plane rotated through 90° with respect to the linearly polarized light emitted from the light source section 112. Accordingly, the light detecting section 122 receives only light having returned from the specimen surface 126.

The light detecting section 122 detects information on the wavelength, intensity, etc. of light received and sends it to the data processing section 124. The data processing section 124 processes information from the light detecting section 122 and driving data for the scanning mirror 152, thereby obtaining data concerning, for example, a light intensity detected at an individual place.

As can be understood from the above description, in the scanning confocal optical device of the embodiment, the polarizing/separating element 120 interrupts unnecessary light, light returning from places other than the specimen surface 126, caused by the Fresnel reflection, for instance. Since, as described above, only light returning from the specimen surface 126 is detected, even an object of a low reflectance, such as a living body, can be observed at a high S/N ratio.

Since light reflected from the outside surface (one of the surfaces nearer to the specimen) of the polarized-plane modulating element 118 has the same polarized plane as the light returning from a living body, it may be thought that it causes noise. However, a greater part of this light is interrupted by the stationary mirror 158, and hence hardly reaches the light detecting section 122.

The following is lens data for the condenser 156:

| S | RDY | THI | nd |
|---|---|---|---|
| OBJ | INF | 0.0800 | 1. |
| 1 | INF | 1.0000 | 1. |
| 2 | 1.1470 | 0.9000 | 1.847 |
| 3 | −1.550 | 0.0600 | 1. |
| 4 | INF | 1.0000 | 1.5420 |
| 5 | INF | 0.3000 | 1.5163 |
| 6 | INF | 0.2816 | 1. |
| IMG | INF | 0. | |

| S3 | ASP | RDY | K | |
|---|---|---|---|---|
| | −1.5500 | −1.9047 | | |
| AC2/12 | AC4/14 | AC6/16 | AC8/18 | AC10/20 |
| 0.0000 | 4.1045 × $10^{-1}$ | −2.9762 × $10^{-1}$ | 9.4695 × $10^{-2}$ | 7.3748 × $10^{-1}$ |
| 1.6119 | 1.0203 | 6.9717 × $10^{-1}$ | −3.8985 × $10^{-1}$ | −1.7023 |

This lens comprises an aspheric lens, which has a central portion coated with aluminum by deposition. A phase plate is located at the surface of the lens nearer to the specimen surface, and further, a protective cover lens is located at the outside surface of the phase plate.

In the above data, K, AC2 . . . denote aspheric coefficients with the surface configuration set at a rotationally symmetric aspheric surface of an even number order. Assuming that the optical axis is the Z direction, the surface configuration (the Z component at each point (X, Y)) is given by the following equation:

$$Z=1/RDY \times S^2/(1+(1-(K+1) \times RDY^{-2} \times S^2)+AC2 \times S^2+AC4 \times S^4+AC6 \times S^6+$$

where $S^2=x^2+y^2$, and RDY represents a curvature radius.

Second Embodiment

Figure 2:
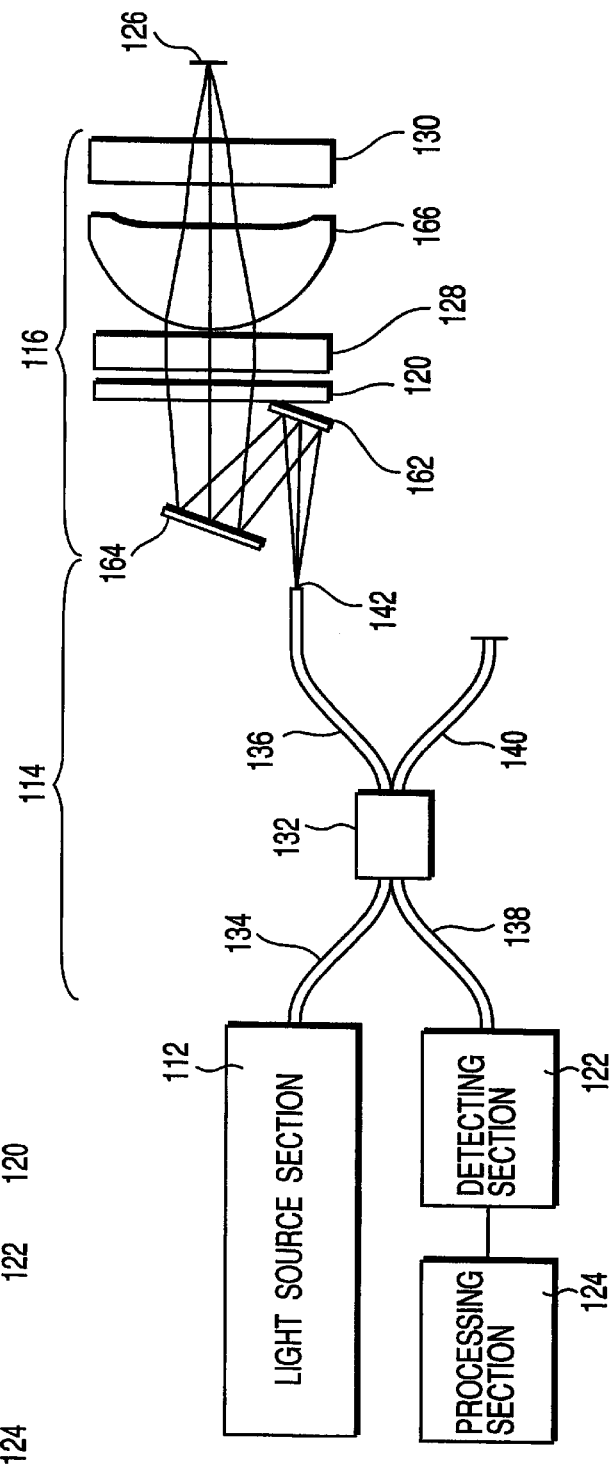
FIG. 2 shows a scanning confocal optical device according to a second embodiment of the invention.

FIG. 2 shows a scanning confocal optical device according to a second embodiment. In FIG. 2, similar elements to those shown in FIG. 1 are denoted by same reference numerals. To avoid a repeat description, emphasis will be given to describe different elements.

The light scanning section 116 has a scanning system comprising two reflective surfaces 162 and 154, and a condenser 166 for focusing a beam of light from the reflective surface 164 on the specimen surface 126. The section 116 further includes a polarized-plane modulating system having two λ/4 plates 128 and 130, and a polarizing/separating element 120. The two reflective surfaces 162 and 164 are arranged such that their normal lines incline with respect to the optical axis. The condenser 166 comprises, for example, an aspheric lens, which preferably has no flat portion perpendicular to the optical axis.

The scanning system comprising the two reflective surfaces 162 and 164 includes at least one scanning mirror. In an example, one of the reflective surfaces 162 and 164 comprises a two-dimensionally scanning mirror, and the other comprises a fixedly supported mirror. In another example, the reflective surfaces 162 and 164 comprise two one-dimensionally scanning mirrors, which are arranged so that their scanning directions intersect each other, preferably, perpendicular to each other.

A preferable scanning mirror comprises a micromachined mirror of a gimbal structure, which is manufactured by the micromachining technique. The micromachined mirror has a reflective surface swingably supported by the gimbal structure. Specifically, the reflective surface is swung using, for example, electrostatic power. A beam of light reflected by the swingable reflective surface is two-dimensionally scanned.

The two λ/4 plates 128 and 130, which constitute the polarized-plane modulating system, are arranged so that the condenser 166 is interposed therebetween. Each of the λ/4 plates 128 and 130 has a pair of transmissible surfaces parallel to each other, and the λ/4 plates 128 and 130 are arranged so that the normal lines of the transmissible surfaces incline to the optical axis. The λ/4 plate 130, which will be located close to the specimen surface, may also serve as a cover glass as in the first embodiment.

The polarizing/separating element 120 comprises, for example, a linearly polarizing element, which is interposed between the reflective surface 164, which constitutes a part of the scanning system, and the λ/4 plate 128, which constitutes a part of the polarized-plane modulating system. The optical fiber 138 for guiding, to the light detecting section 122, light returning from the specimen surface 126 is optically directly connected to the light detecting section 122.

Laser light emitted from the light detecting section 122 is transmitted through the optical fiber 134, the four-terminal coupler 132, the optical fiber 136 in this order, and then exits from the core of the end face 142, which serves as a confocal pinhole. A beam of light exiting from the optical fiber 136 passes the scanning system, which comprises the two reflective surfaces 162 and 164, then passes the polarizing/separating element 120, the λ/4 plate 128, the condenser 166 and the λ/4 plate 130 in this order, and focused the specimen surface 126 by the condensing force of the condenser 166.

Light returning from the specimen surface 126 passes the λ/4 plate 130, the condenser 166 and the λ/4 plate 128 in this order, and reaches the polarizing/separating element 120. Since the light entering the polarizing/separating element 120 passes through each of the λ/4 plates 128 and 130 twice, it is converted into linearly polarized light having a polarized plane rotated through 180° with respect to the linearly polarized light exiting from the optical fiber 136. Accordingly, the light can pass the polarizing/separating element 120.

The light passing through the polarizing/separating element 120 passes through the two reflective surfaces 162 and 164, which constitute the scanning system, is converged onto the end face 142 of the optical fiber 136 by the condensing function of the condenser 166, and passes through the optical fiber 136.

The light passing through the optical fiber 136 further passes through the four-terminal coupler 132 and the optical fiber 138, and enters the light detecting section 122. The light detecting section 122 detects information concerning the wavelength, intensity, etc. of light having entered it, and supplies the information to the data processing section 124. The data processing section 124 processes the information from the light detecting section 122 and driving data for the scanning mirror 152, thereby obtaining data concerning, for example, a light intensity detected at an individual place.

In the structure of this embodiment, the light returning, to the polarizing/separating element or linear polarizer 120, from surfaces of the condenser 166 and from the surfaces of the λ/4 plates 128 and 130 that are nearer to the condenser 166 is circularly polarized light. This circularly polarized light hardly passes through the polarizing/separating element 120. Further, the light returning from the surface of the λ/4 plate 128 that is nearer to the polarizing/separating element 120 and from the surface of the λ/4 plate 130 that is nearer to the specimen surface 126 can pass through the polarizing/separating element 120, but cannot enter the optical fiber 136 since the λ/4 plates 128 and 130 are at an angle of, for example, 2–3 degrees with respect to the optical axis. Accordingly, only light returning from the specimen surface 126 is detected, which enables observation, at a high S/N ratio, of even an object of a low reflectance, such as a living body.

Moreover, in this embodiment, the light transmitting section 114 does not need a function for maintaining the polarized plane of light while transmitting it. Therefore, the structure of this embodiment is advantageous in that a wide range of optical elements can be applicable to the light transmitting section 114. In addition, the device of this embodiment is not adversely affected by a slight change in the polarized radiation plane, which may occur in the light transmitting section 114.

Third Embodiment

Figure 3:
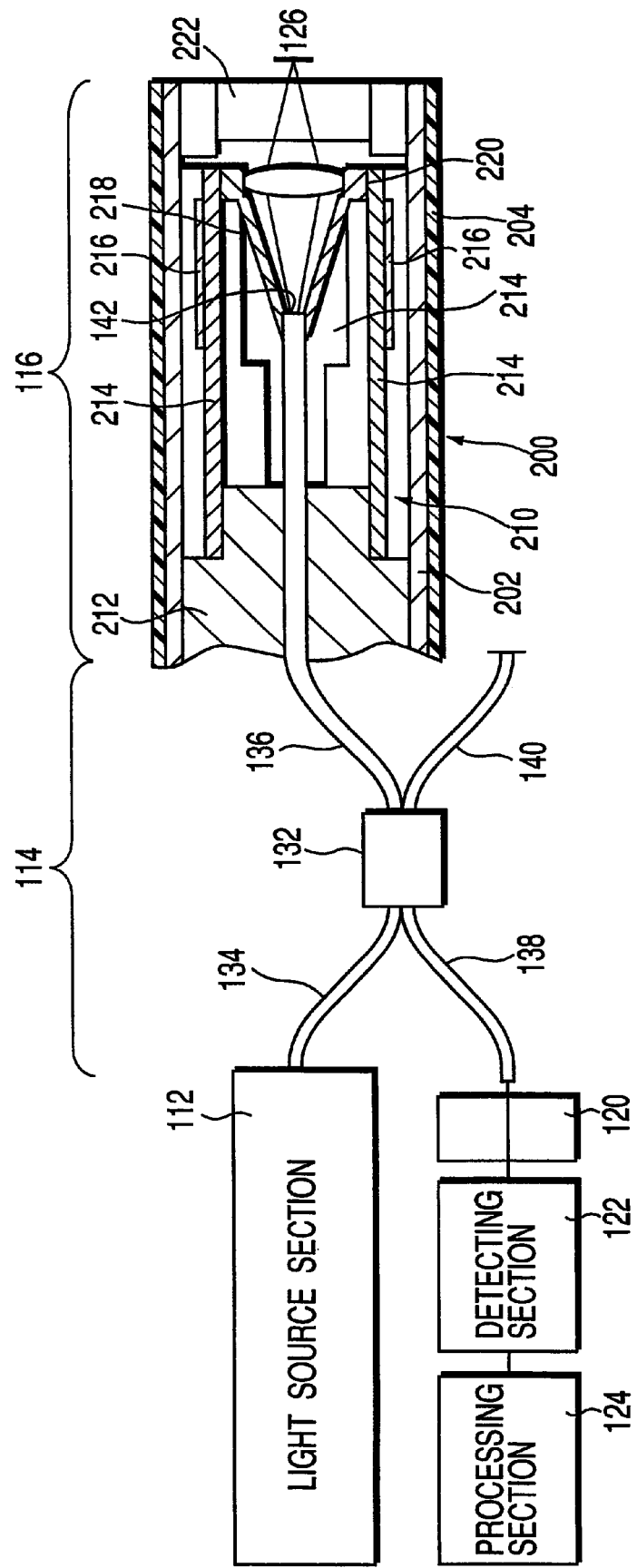
FIG. 3 shows a scanning confocal optical device according to a third embodiment of the invention.
Figure 4:
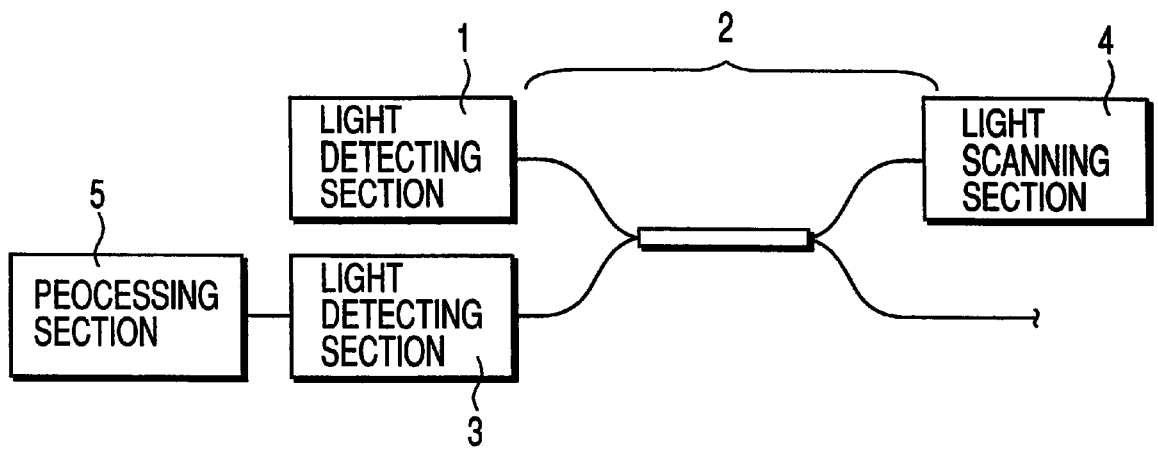
FIG. 4 shows a conventional fine scanning confocal optical device.
Figure 5:
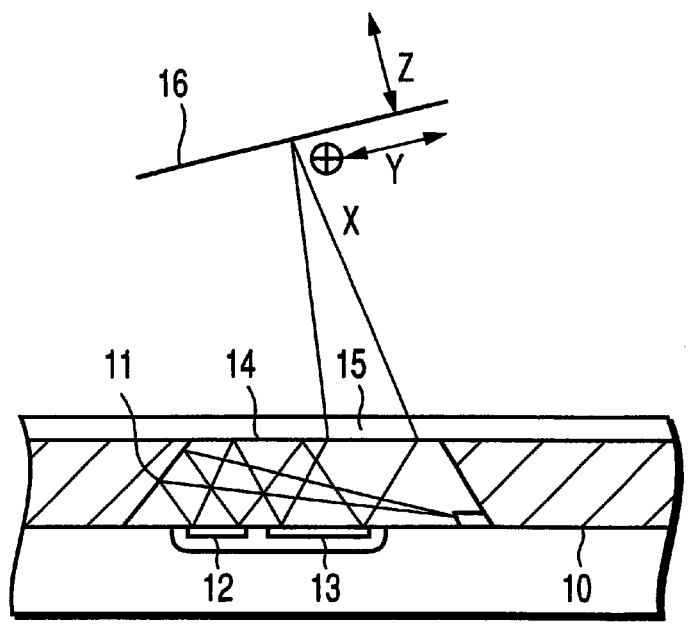
FIG. 5 shows a light scanning section incorporated in the confocal optical device of FIG. 4.

FIG. 3 shows a scanning confocal optical device according to a third embodiment. In the figure, similar elements to those shown in FIG. 1 are denoted by same reference numerals. To avoid a repeat description, emphasis will be given to describe different elements.

This scanning confocal optical device has a cylindrical optical frame 200, which contains the light scanning section 116 and a polarized-plane modulating element 222. The optical frame 200 comprises, for example, the hard section of the endoscope, and has a cylindrical main body 202 and a cover section 204 covering the outer peripheral surface of the body 202.

The light scanning section 116 has an optical scanning unit 210. The scanning unit 210 includes a base 212 fixed to the optical frame 200, four elastically deformable thin plates 214 (three of which are shown), four piezoelectric elements 216 (two of which are shown) for deforming the corresponding four thin plates 214, respectively, a support member 218 supported by the four thin plates 214, and a condenser 220 fixed on the holding member 218.

The holding member 218 holds an end of the optical fiber 136 extending through the base 212, thereby fixing the positional relationship between the end of the optical fiber 136 and the condenser 220. Each of the thin plates 214 has an end fixed on the base 212, and the other end fixed on the holding member 218. The four thin plates 214 are circumferentially arranged at regular intervals of 90 degrees. In other words, two thin plates 214 are opposed to each other in a certain direction, with the optical fiber 136 and the condenser 220 interposed therebetween, while the other two thin plates are opposed to each other in a direction perpendicular to the first-mentioned one, with the optical fiber 136 and the condenser 220 interposed therebetween.

Each of the piezoelectric elements 216 is fixed on the corresponding one of the thin plates 214 by adhesion, and adapted to bend it in a direction perpendicular to the plane when receiving a driving signal. Accordingly, the optical axis of the condenser 220 can be desirably changed by controlling driving signals to be supplied to the four piezoelectric elements 216, thereby appropriately setting the bending direction of each thin plate 214 and the bending force applied thereto. For example, the direction of the optical axis of the condenser 220 is changed on the basis of a predetermined rule, so that a beam of light focused the condenser 220 can be scanned.

The polarized-plane modulating element 222 is fixed to a front end of the optical frame 200, and also serves as the cover glass of the endoscope. The polarized-plane modulating element 222 comprises, for example, a λ/4 plate for converting, into circularly polarized light, linear polarized light exiting from the end face 142 of the optical fiber 136. Since light returning from the specimen surface 126 enters the condenser 220 after it passes through the λ/4 plate 222 twice, it is converted into linearly polarized light having a polarized plane rotated through 90° with respect to the linearly polarized light exiting from the end face 142 of the optical fiber 136.

Laser light emitted from the light source section 122 passes through the optical fiber 134, the four-terminal coupler 132 and the optical fiber 136 in this order, and exits the core of the end face 142 of the fiber 136, which serves as a confocal pinhole. A beam of light from the optical fiber 136 is focused on the specimen surface 126 by the condenser 220 through the λ/4 plate 222.

Light returning from specimen surface 126 passes through the λ/4 plate 222, and is converged by the condenser 220 onto the end face 142 of the optical fiber 136. Since light entering the optical fiber 136 passes through the λ/4 plate 222 twice after exiting therefrom, it is converted into linearly polarized light having a polarized plane rotated through 90° with respect to the light exiting from the optical fiber 136.

The light having entered the optical fiber 136 passes through the optical fiber 136, the four-terminal coupler 132, and the optical fiber 138 in this order, and reaches the polarizing/separating element 120. The polarizing/separating element 120 transmits only components having a particular polarized plane, which are contained in the light projected from the optical fiber 138. More specifically, the element 120 transmits only light having a polarized plane rotated through 90° with respect to the light emitted from the light source section 112. Accordingly, only light having returned from the specimen surface 126 can pass the polarizing/separating element 120 and enter the light detecting section 122.

The light detecting section 122 detects information on the wavelength, intensity, etc. of light received. The data processing section 124 processes information from the light detecting section 122 and driving data for the scanning mirror 152, thereby obtaining data concerning, for example, a light intensity detected at an individual place.

Since in the scanning confocal optical device of this embodiment, only light returning from the specimen surface 126 is detected by virtue of the polarizing/separating element 120, even an object of a low reflectance, such as a living body, can be observed at a high S/N ratio.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning confocal optical device comprising:
   a light source for emitting light;
   a light scanning section for focusing a beam of light from the light source on a specimen surface to scan the focused beam of light across the specimen surface, the light scanning section including a condenser for focusing the beam of light on the specimen surface, and scanning means for scanning the beam of light across the specimen surface;
   a confocal pinhole situated between the light source and the light scanning section, and considered substantially a point light source, a confocal optical system being formed between the confocal pinhole and the specimen surface;
   polarized-plane modulating means for imparting relatively different polarized states between light returning from the specimen surface and light returning from others;
   polarizing/separating means for extracting the light returning from the specimen surface on the basis of a difference of the polarized states;
   a light detecting section for detecting the light returning from the specimen surface and extracted by the polarizing/separating means; and
   a light transmitting section for transmitting the light from the light source to the light scanning section, and the returning light from the light scanning section to the light detecting section.

2. A scanning confocal optical device according to claim 1, wherein the scanning means includes at least two reflective mirrors, at least one of the two reflective mirrors comprising a scanning mirror.

3. A scanning confocal optical device according to claim 2, wherein the polarized-plane modulating means rotates a polarized plane of the light returning from the specimen surface through 90° with respect to the light from the light source.

4. A scanning confocal optical device according to claim 2, wherein each of the reflective mirrors has a reflective surface, which has a normal line inclined to an optical axis.

5. A scanning confocal optical device according to claim 1, wherein the polarized-plane modulating means rotates a polarized plane of the light returning from the specimen surface through 90° with respect to the light from the light source.

6. A scanning confocal optical device according to claim 5, wherein the polarized-plane modulating means comprises a polarized-plane modulating element interposed between the condenser and the specimen surface.

7. A scanning confocal optical device according to claim 6, wherein the polarized-plane modulating element comprises a $\lambda/4$ plate.

8. A scanning confocal optical device according to claim 1, wherein the polarizing/separating means is interposed between the light transmitting section and the light detecting section.

9. A scanning confocal optical device according to claim 8, wherein the polarizing/separating means comprises a polarizing/separating element for transmitting light having a particular polarized plane.

10. A scanning confocal optical device according to claim 9, wherein the polarizing/separating element comprises a linearly polarizing element.

11. A scanning confocal optical device according to claim 9, wherein the polarizing/separating element comprises a polarizing beam splitter.

12. A scanning confocal optical device according to claim 8, wherein the light transmitting section has an optical fiber capable of keeping a polarized plane of light.

13. A scanning confocal optical device according to claim 1, wherein the light scanning section includes at least one transparent member, which has a transmitting surface having a normal line inclined to an optical axis.

14. A scanning confocal optical device according to claim 13, wherein the scanning means includes at least two reflective mirrors, at least one of the two reflective mirrors comprising a scanning mirror.

15. A scanning confocal optical device according to claim 14, wherein each of the reflective mirrors has a reflective surface, which has a normal line inclined to an optical axis.

* * * * *